US008687961B2

(12) United States Patent
Tan et al.

(10) Patent No.: US 8,687,961 B2
(45) Date of Patent: Apr. 1, 2014

(54) OPTICAL BROADCAST WITH BUSES WITH SHARED OPTICAL INTERFACES

(75) Inventors: Michael Renne Ty Tan, Menlo Park, CA (US); Joseph Straznicky, Santa Rosa, CA (US); Paul Kessler Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 251 days.

(21) Appl. No.: 13/126,840

(22) PCT Filed: Oct. 31, 2008

(86) PCT No.: PCT/US2008/012351
§ 371 (c)(1),
(2), (4) Date: Apr. 29, 2011

(87) PCT Pub. No.: WO2010/050915
PCT Pub. Date: May 6, 2010

(65) Prior Publication Data
US 2011/0211843 A1    Sep. 1, 2011

(51) Int. Cl.
*H04B 10/00*    (2013.01)

(52) U.S. Cl.
USPC ............................... 398/66; 398/59; 398/182

(58) Field of Classification Search
CPC ......... H04B 10/30; H04B 10/70; H04B 10/00
USPC .................. 398/140, 59–60, 66–67, 167, 182
See application file for complete search history.

(56) References Cited

U.S. PATENT DOCUMENTS

| 4,630,256 A * | 12/1986 | Albanese ..................... 398/60 |
| 4,662,715 A * | 5/1987 | Shutterly ..................... 385/24 |
| 4,930,863 A * | 6/1990 | Croitoriu et al. ............. 385/125 |
| 5,402,479 A * | 3/1995 | Ellersick et al. ............. 379/237 |
| 6,661,940 B2 * | 12/2003 | Kim .............................. 385/15 |

(Continued)

FOREIGN PATENT DOCUMENTS

| EP | 1339179 | 8/2003 |
| JP | 1983-073253 | 5/1983 |

(Continued)

OTHER PUBLICATIONS

Tan, Michael, et al. "A high-speed optical multi-drop bus for computer interconnections." Applied Physics A: Materials Science & Processing 95.4 (2009): 945-953.

(Continued)

*Primary Examiner* — Leslie Pascal

(57) ABSTRACT

Various embodiments of the present invention are directed to optical broadcast buses configured with shared optical interfaces for fan-in and fan-out of optical signals. In one aspect, an optical broadcast bus comprises a number of optical interfaces, a fan-in bus optically coupled to the number of optical interfaces, and a fan-out bus optically coupled to the number of optical interfaces. Each optical interface is configured to convert an electrical signal produced by the at least one node into an optical signal that is received and directed by the fan-in bus to the fan-out bus and broadcast by the fan-out bus to the number of optical interfaces. Each optical interface also converts the optical signal into an electrical signal that is sent to the electronically coupled at least one node for processing.

15 Claims, 12 Drawing Sheets

(56) References Cited

U.S. PATENT DOCUMENTS

| | | | |
|---|---|---|---|
| 2004/0264969 A1* | 12/2004 | Lee et al. | 398/115 |
| 2005/0147414 A1* | 7/2005 | Morrow et al. | 398/142 |
| 2006/0204168 A1* | 9/2006 | Douma | 385/14 |
| 2007/0196112 A1* | 8/2007 | Crews | 398/202 |
| 2009/0034906 A1* | 2/2009 | Tan et al. | 385/24 |
| 2011/0097086 A1* | 4/2011 | Binkert et al. | 398/71 |

FOREIGN PATENT DOCUMENTS

| | | |
|---|---|---|
| JP | 1988-179640 | 7/1988 |
| JP | 1992-268846 | 9/1992 |
| JP | 1996-234026 | 9/1996 |
| JP | 1997-153907 | 6/1997 |
| JP | 1999-212686 A | 8/1999 |
| JP | 2003-141092 A | 5/2003 |

OTHER PUBLICATIONS

European Search Report (Supplementary) and Search Opinion, Mar. 15, 2013. EP Application No. 08877838.6.

* cited by examiner

OPTICAL BROADCAST WITH BUSES WITH SHARED OPTICAL INTERFACES

TECHNICAL FIELD

Embodiments of the present invention relate to computer buses, and, in particular, to optical broadcast buses.

BACKGROUND

Typical electronic broadcast buses comprise a collection of signal lines that interconnect nodes. A node can be a processor, a memory controller, a server blade of a blade system, a core in a multi-core processing unit, a circuit board, an external network connection. The broadcast bus allows a node to broadcast messages such as instructions, addresses, and data to nodes of a computational system. Any node in electronic communication with the bus can receive messages sent from the other nodes. However, the performance and scalability of electronic broadcast buses is limited by issues of bandwidth, latency, and power consumption. As more nodes are added to the system, there is more potential for activity affecting bandwidth and a need for longer interconnects, which increases latency. Both bandwidth and latency are satisfied with more resources, which results in increases in power. In particular, electronic broadcast buses tend to be relatively large and consume a relatively large amount of power, and scaling in some cases is detrimental to performance.

Accordingly, scalable broadcast buses exhibiting low-latency and high-bandwidth are desired.

SUMMARY

Various embodiments of the present invention are directed to optical broadcast buses configured with shared optical interfaces for fan-in and fan-out of optical signals. In one aspect, an optical broadcast bus comprises a number of optical interfaces, a fan-in bus optically coupled to the number of optical interfaces, and a fan-out bus optically coupled to the number of optical interfaces. Each optical interface is configured to convert an electrical signal produced by the at least one node into an optical signal that is received and directed by the fan-in bus to the fan-out bus and broadcast by the fan-out bus to the number of optical interfaces. Each optical interface also converts the optical signal into an electrical signal that is sent to the electronically coupled at least one node for processing.

DETAILED DESCRIPTION

Various embodiments of the present invention are directed to optical broadcast buses configured with shared optical interfaces for fan-in and fan-out of optical signals. Each optical interface is electronically coupled to a number of nodes. When a node is permitted to broadcast information, the node encodes the information in electrical signals and sends electrical signals to an electronically coupled optical interface. The optical interface receives the electrical signals and converts the electrical signals into optical signals that are distributed to all of the optical interfaces. Each optical interface converts the optical signals into electrical signals and sends the electrical signals to the electronically coupled nodes. An electrical signal can encode information in relatively high and low voltage or current amplitudes, where a relatively high amplitude in a discrete time domain can represent the bit "0" and a relatively low or no amplitude in a discrete time domain can represent the bit "1." Likewise, an optical signal can encode information in relatively high and low electromagnetic radiation amplitudes, where a relatively high amplitude in a discrete time domain can represent the bit "0" and a relatively low or no amplitude in a discrete time can represent the bit "1."

Broadcast Buses with Optical Interfaces

Figure 1:
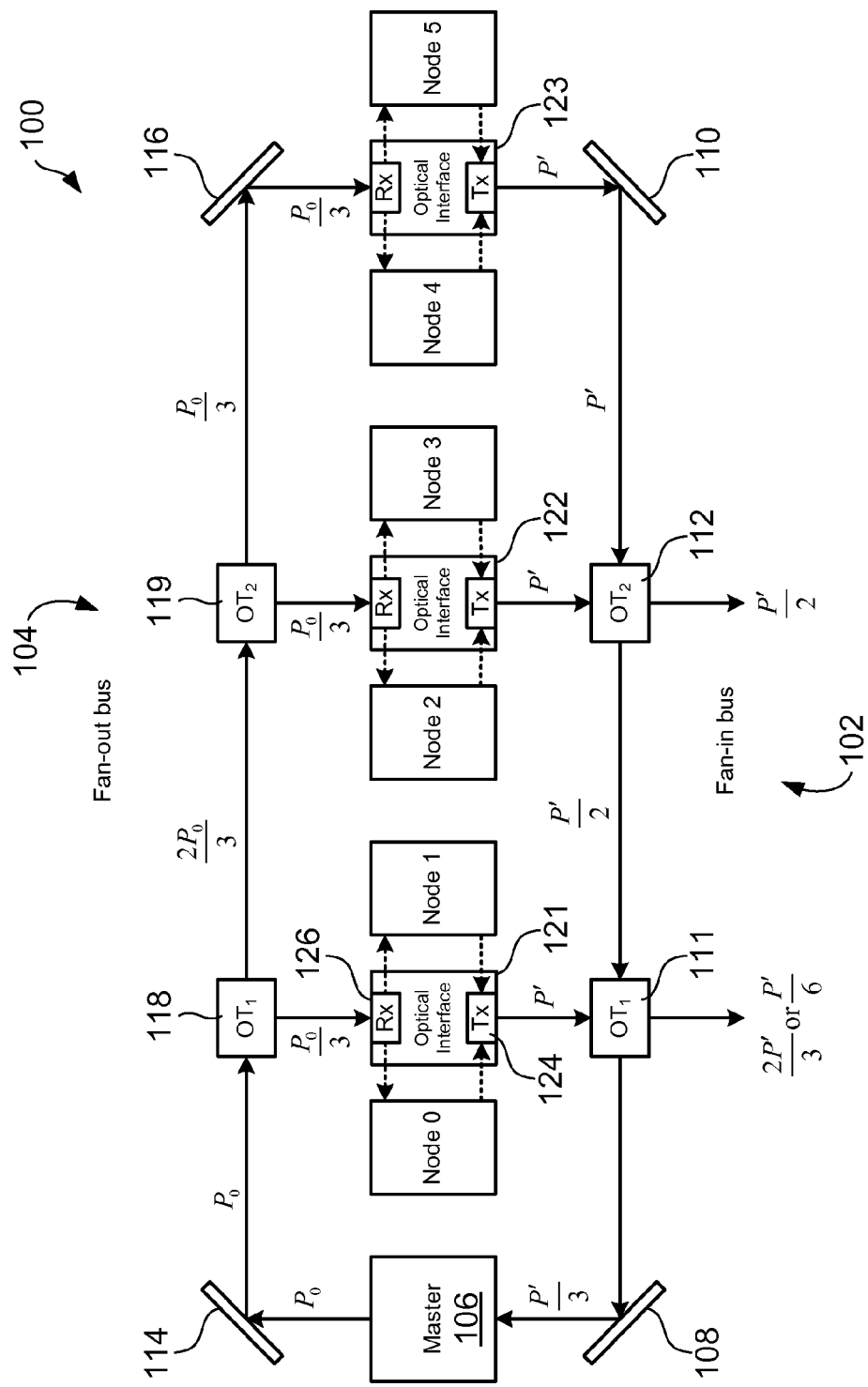
FIG. 1 shows a schematic representation of a first optical broadcast bus configured in accordance with embodiments of the present invention.

FIG. 1 shows a schematic representation of an exemplary optical broadcast bus 100 configured in accordance with embodiments of the present invention. The bus 100 includes a fan-in bus 102, a fan-out bus 104, and a master control 106. The fan-in bus 102 includes mirrors 108 and 110 and two optical taps 111-112. The fan-out bus 104 includes mirrors 114 and 116 and two optical taps 118-119. As shown in FIG. 1, the bus 100 also includes three optical interfaces 121-123. Each optical interface is disposed between two nodes and includes a transmitter identified by Tx and a receiver identified by Rx. The six nodes are labeled 0 through 5. The nodes can be any combination of processors, memory, memory controllers, server blades of a blade system, clusters of multi-core processing units, circuit boards, external network connections, or any other data processing, storing, or transmitting device. The transmitter Tx and the receiver Rx of each optical interface are electronically coupled to the neighboring nodes. Dashed-line directional arrows represent the path of electrical signals between the transmitter/receivers and the neighboring nodes. For example, optical interface 121 is disposed between nodes 0 and 1 and includes transmitter Tx 124 and receiver Rx 126. The transmitter Tx converts electrical signals produced by the nodes 0 and 1 into optical signals that are sent over the fan-in bus 102 to the master control 106. On the other hand, the receiver Rx 126 converts optical signals broadcast by the master control 106 over the fan-out bus 104 into electrical signals that can be processed by nodes 0 and 1.

As shown in the example of FIG. 1, solid-line directional arrows represent the direction optical signals propagate along optical communication paths of the fan-in and fan-out buses 102 and 104. The term "optical communication path" refers to optical interconnects and to light transmitted through free space. The optical communication paths within the fan-in bus 102 and the fan-out bus 104 can be 12 bit wide lanes. Each lane can be implemented with optical fibers, ridge waveguides, or free space. Each lane can also be implemented with a hollow waveguide composed of a tube with an air core. The structural tube forming the hollow waveguide can have inner core materials with refractive indices greater than or less than one. The tubing can be composed of a suitable metal, glass, or plastic and metallic and dielectric films can be deposited on the inner surface of the tubing. The hollow waveguides can be hollow metal waveguides with high reflective metal coatings lining the interior surface of the core. The air core can have a cross-sectional shape that is circular, elliptical, square, rectangular, or any other shape that is suitable for guiding light. Because the waveguide is hollow, optical signals can travel along the core of a hollow waveguide with an effective index of about 1. In other words, light propagates along the core of a hollow waveguide at the speed of light in air or vacuum.

The master control 106 is an optical-to-electrical-to-optical converter that receives optical signals reflected off of mirror 108, reproduces the optical signals, and broadcast the optical signals by transmitting the optical signals to the mirror 114. The master control 106 overcomes attenuation or loss caused by the optical signals traveling through the fan-in bus 102. In addition to strengthening the optical signals, the master control 106 can also be used to remove noise or other unwanted aspects of the optical signals. The amount of optical power produced by the master control 106 is determined by the number of nodes attached to the fan-out bus, the system loss, and the sensitivity of the receivers. In other words, the master control 106 produces optical signals with enough optical power to reach all of the receivers.

The master control 106 can also include an arbiter that resolves conflicts by employing an arbitration scheme that prevents two or more nodes from simultaneously using the fan-in bus 102. In many cases, the arbitration carried out by the master control 106 lies on the critical path of computer system performance. Without arbitration, the master control 106 could receive optical signals from more that one node on the same optical communication path, where the optical signals combine and arrive indecipherable at the master control 106. The arbiter ensures that before the fan-in bus 102 can be used, a node must be granted permission to broadcast over the fan-in bus 102, in order to prevent simultaneous optical signal transmissions to the master control 106.

In other broadcast bus embodiments, the master control 106 can be eliminated and arbitration can be performed using time-division multiplexing ("TDM"). With the master control 106 eliminated, optical signals are routed from mirror 108 directly to mirror 114 of the fan-out bus 104. In TDM arbitration, arbitration is carried out in rounds of arbitration. Each round of arbitration is subdivided into broadcasting time periods. Within each round of arbitration, each node is assigned one of the broadcasting time periods in which a node can broadcast. For example, a TDM round of arbitration for the six nodes 0-5 may have six broadcasting time periods. Each node can broadcast only within one of the six time periods.

The optical signals broadcast by nodes 0-5 over the fan-in bus 102 and the fan-out bus 104 can be in the form of packets that include headers. Each header identifies a particular node as the destination for data carried by the optical signals. All of the optical interfaces receive the optical signals over the fan-out bus 104. However, because the header of each packet identifies a particular node as the destination of the data, only the node identified by the header actually receives and processes the information encoded in the optical signals.

The optical taps of the fan-out bus are configured to distribute the optical power approximately equally among the optical interfaces. In general, for a system comprising n optical interfaces, the optical taps are configured to each divert about 1/nth of the total optical power of an optical signal output from a master control to each of the optical interfaces. The optical taps of the fan-in bus are also configured so that approximately an equal amount of optical power is received by the master control from each optical interface on the fan-in bus. In other words, the optical taps are configured in the fan-in bus so that the master control receives about 1/nth of the total optical power output from each optical interface.

Optical broadcast bus embodiments are not limited to computational systems comprising six nodes and can be scaled up or down to provide broadcasting for computational system comprising a variety of nodes and node configurations. In general, a broadcast system comprising n optical interfaces includes n−1 optical taps in the fan-in bus and n−1 optical taps in the fan-out bus. The optical taps are identified in FIG. 1 as $OT_m$, where the subscript m is an integer satisfying the condition $1 \leq m \leq n-1$. The optical taps 118 and 119 are configured so that ⅓ of the optical power of an optical signal reflected off of mirror 114 reaches the receivers Rx of the optical interfaces 121-123, and the optical taps 111 and 112 are configured so that ⅓ of the total optical power output from each optical interface is reflected off the mirror 108. The reflectance and transmittance of the optical taps can be approximated as follows. The optical taps reflect a fraction of the optical signal power in accordance with:

$$R_m \square \frac{1}{(n-m+1)}$$

and transmit a fraction of the optical signal power in accordance with:

$$T_m \square \frac{(n-m)}{(n-m+1)}$$

Thus, in general, an optical tap $OT_m$ receives an optical signal with optical power P from the master controller 106 or from a transmitter and outputs a reflected portion with optical power $PR_m$ and outputs a transmitted portion with optical power $PT_m$, where $P=PR_m+PT_m+L_m$, and $L_m$ represents optical power loss at the optical tap $OT_m$ due to absorption, scattering, or misalignment.

As shown in the example of FIG. 1, the optical taps $OT_1$ and $OT_2$ used in the fan-in bus 102 are identical to the optical taps used in the fan-out bus 104. However, the optical taps 111-112 of the fan-in bus 102 are oriented so that an approximately equal amount of optical power is received by the master control 106 from each optical interface in the fan-in bus 102, and the optical taps 118-119 are oriented to distribute the optical power of the optical signal output from the master control 106 approximately equally among nodes 0-5. In particular, according to the reflectance $R_m$ and the transmittance $T_m$ above, the optical tap $OT_1$ has an $R_1$ of ⅓ and a $T_1$ of ⅔ and $OT_2$ has an $R_2$ of ½ and a $T_2$ of ½. FIG. 1 reveals how the optical taps $OT_1$ 118 and $OT_2$ 119 of the fan-out bus 104 are configured and oriented so that the optical power of the optical signal received by each optical interface is $P_0/3$, where $P_0$ is the power of the optical signal output from the master control 106. FIG. 1 also reveals how the optical taps $OT_1$ 111 and $OT_2$ 112 of the fan-in bus 102 are configured and oriented so that the optical power of the optical signal received by the master control 106 is approximately P'/3, where P' is the power of the optical signal output from each of optical interfaces 121-123. In certain embodiments, the optical taps can be beamsplitters, and in other embodiments, the optical taps can be variable couplers.

In other optical broadcast bus embodiments, rather than placing the master control at the end of the nodes as is done with the optical broadcast bus 100 described above, the master control can be disposed between the nodes, in order to reduce the amount of optical power needed to send an optical signal from a broadcasting node to the master control and reduce the amount of optical power needed to broadcast optical signals from the master control to all of the optical interfaces.

Figure 2:
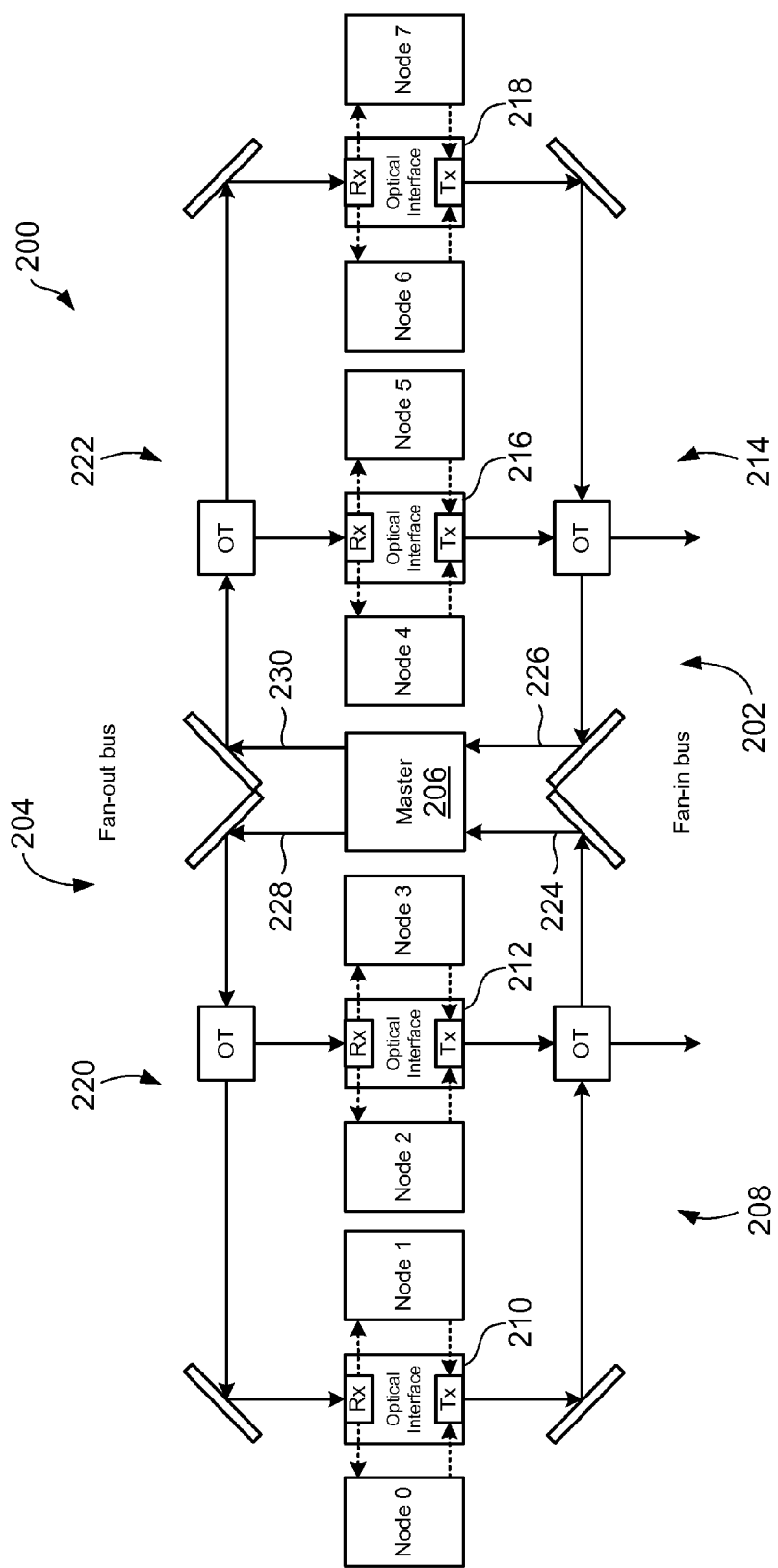
FIG. 2 shows a schematic representation of a second optical broadcast bus configured in accordance with embodiments of the present invention.

FIG. 2 shows an exemplary second optical broadcast bus 200 configured in accordance with embodiments of the present invention. The bus 200 is composed of a fan-in bus 202 and a fan-out bus 204. A master control 206 is disposed in the middle of nodes 0-7. The master 206 may include an arbiter that controls which of nodes 0-7 is granted access to the fan-in bus 202. The fan-in bus 202 is composed of a first fan-in portion 208 that directs optical signals output from optical interfaces 210 and 212 to the master control 206 and a second fan-in portion 214 that directs optical signals output from optical interfaces 216 and 218 to the master control 206. The master control 206 can be configured to separately receive optical signals from the first fan-in portion 208 and the second fan-in portion 214. The fan-out bus 204 is composed of a first fan-out portion 220 that broadcast optical signals output from the master control 206 the optical interfaces 210 and 212 and a second fan-out portion 222 that broadcast optical signals output from the master control 206 to the optical interfaces 216 and 218. The master control 206 receives optical signals output from one of the optical interfaces 210, 212, 216, and 218 over either the fan-in portion 208 or the fan-in portion 214 along the optical communication paths 224 and 226, respectively, and simultaneously produces two optical signals that are output on the optical communication paths 228 and 230, respectively. The reproduced optical signals are then simultaneously broadcast to the optical interfaces 210, 212, 216, and 218 over the first and second fan-out portions 220 and 222 of the fan-out bus 204.

Figure 3:
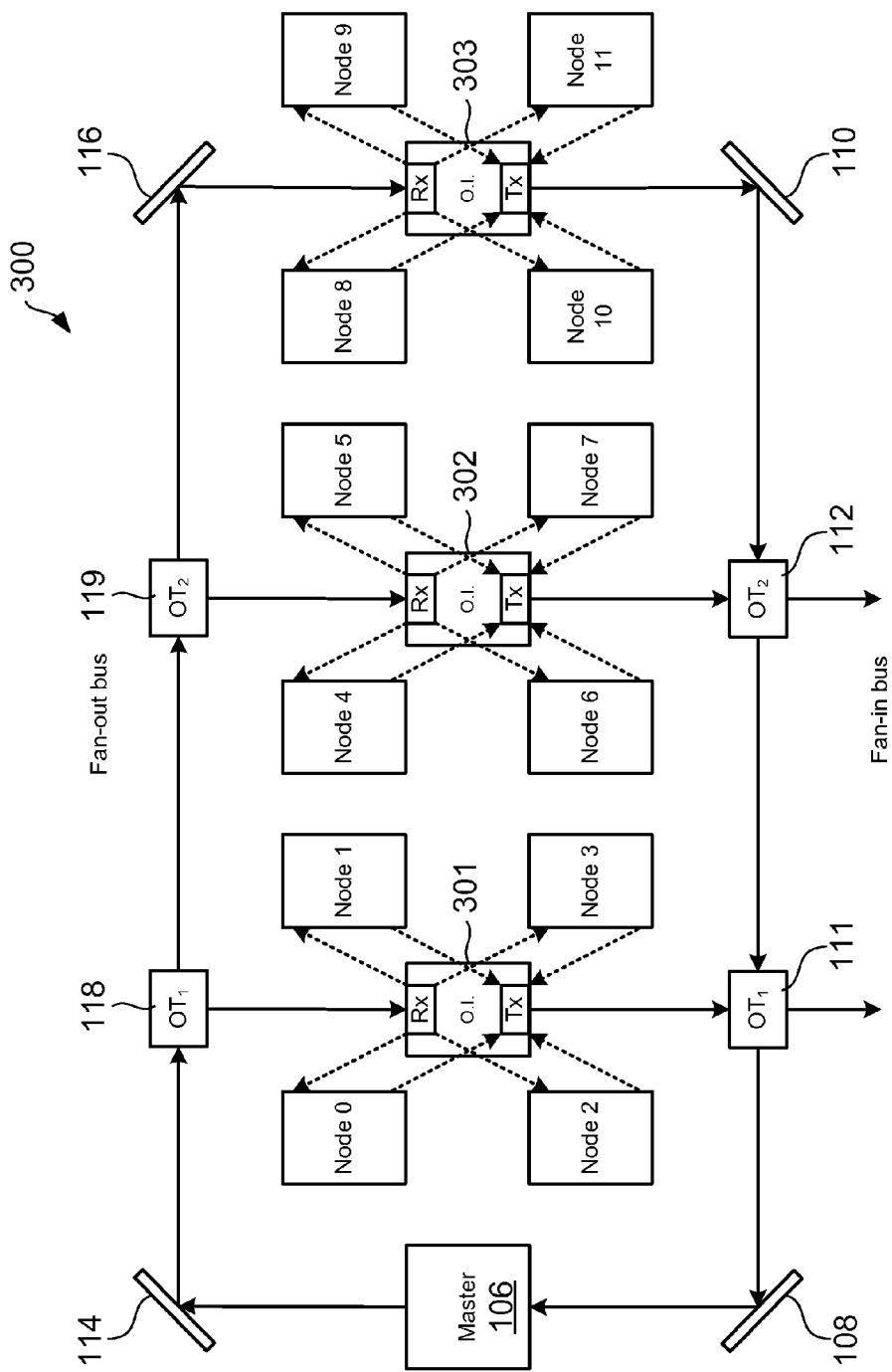
FIG. 3 shows a schematic representation of a third optical broadcast bus configured in accordance with embodiments of the present invention.

The optical interfaces of the optical broadcast buses are not limited to electrical communications with only two nodes. In other embodiments, each optical interface can be configured to provide electrical communications to 3 or more nodes. FIG. 3 shows an exemplary third optical broadcast bus 300 configured in accordance with embodiments of the present invention. The bus 300 is nearly identical to the bus 100 except the optical interfaces 121-123 have been replaced by optical interfaces 301-303. Each of the optical interfaces 301-303 includes a receiver and transmitter that have been configured to electronically communicate with four nodes. For example, the receiver Rx of the optical interface 301 converts optical signals into electrical signals that are sent to nodes 0-3, and transmitter Tx receives electrical signals produced separately by nodes 0-3 and outputs optical signals to $OT_1$. Configuring the receivers and transmitters of the broadcast bus 300 to electronically communicate with four nodes enables the broadcast bus 300 to provide broadcast capabilities for twice as many nodes as optical broadcast bus 100. In other embodiments, the optical interfaces can each electronically communicate with different numbers of nodes.

Figure 4:
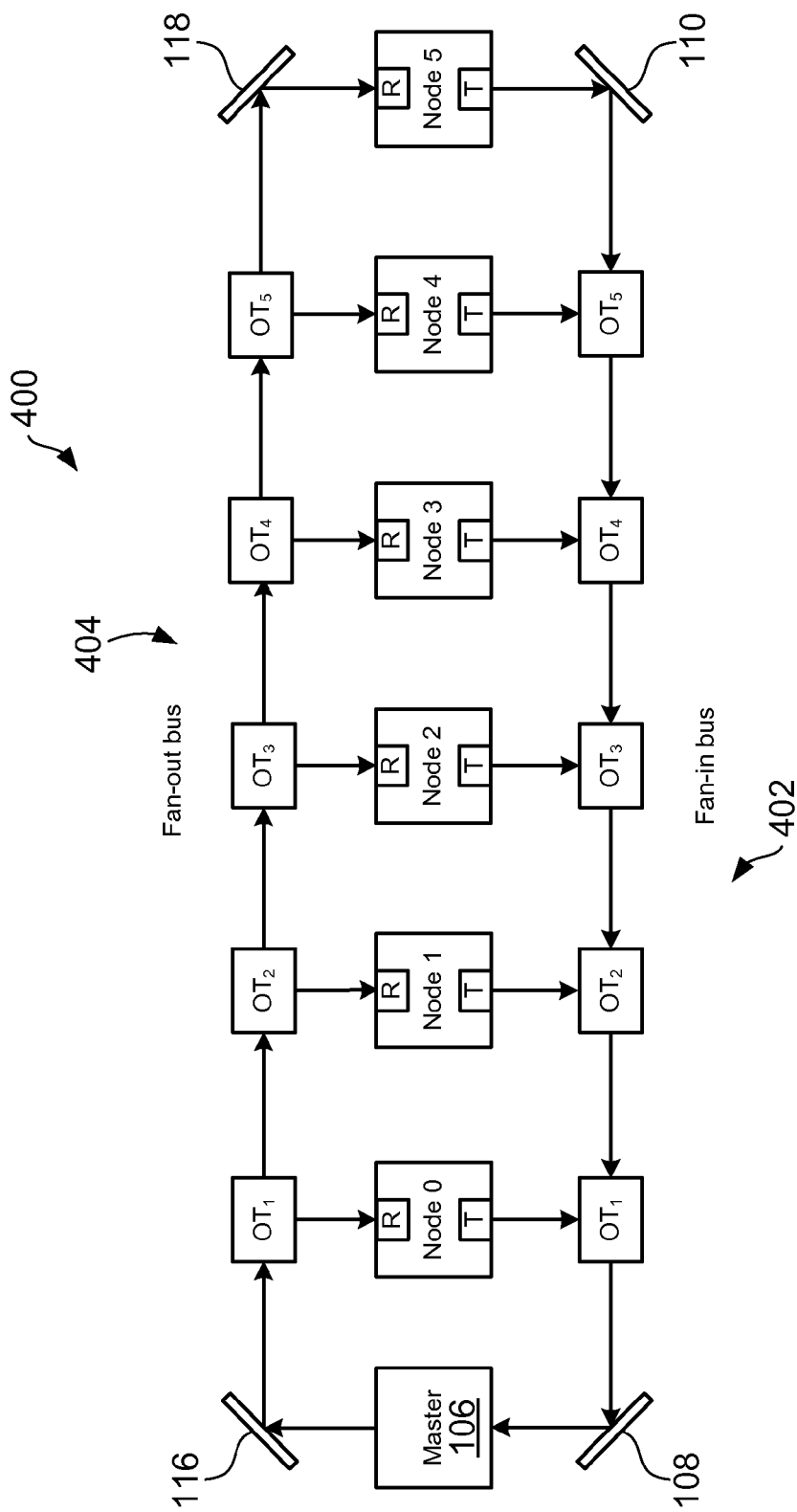
FIG. 4 shows an example of a six node system where each node is configured with a receiver and a transmitter.

In recent years, typical fan-in and fan-out optical broadcast buses have been implemented by configuring each node with an optical transceiver comprising an optical transmitter and an optical receiver. However, the cost of operating a fan-in and fan-out optical broadcast bus with optical transceivers at each node is dominated by the power consumed in operating the optical transceivers. Optical broadcast bus embodiments of the present invention provide power savings over typical optical broadcast buses, where each node is configured with an optical transceiver. FIG. 4 shows a typical optical broadcast bus for an exemplary six node computational system where each node is configured with a receiver and a transmitter. As shown in FIG. 4, each node includes a transmitter and a receiver identified by T and R, respectively, and the fan-in bus 402 and the fan-out bus 404 both include five optical taps. During the fan-in portion of an optical broadcast, only one node is allowed to send optical signals over the fan-in bus 402. All other nodes are on standby consuming power while they wait to broadcast. However, a node on standby can still randomly emit stray photons into the fan-in bus 402 which can be detected as shot noise at the master control 106. These stray photons can create errors while the master control 106 receives optical signals sent by a broadcasting node. In addition, stray photons emitted by standby nodes reduce the extinction ratio of an optical signal received at the master control 106. The extinction ratio is represented by:

$$r_e = \frac{P_1}{P_2}$$

where $P_1$ is the optical power level produced when the transmitter is "on," and $P_2$ is the power level produced when the transmitter is "off."

In contrast, the optical broadcast buses 100, 200, and 300 include at most ½ the number of transmitters and receivers, which reduces costs, shot noise, and increases the extinction ratio. The number of optical taps employed to implement the broadcast bus 100 is less than ½ the number of optical taps employed to implement the optical broadcast bus 400. As a result, the optical power consumed in broadcasting an optical signal to all three of the optical interfaces 121-124 is roughly ½ of the amount of optical power consumed in broadcasting the same optical signal to all six nodes of the broadcast system 400.

Transmitters and Receivers of Optical Interfaces

As described above with reference to FIGS. 1-3, each optical interface includes a transmitter and a receiver. Transmitter embodiments are described below with reference to FIGS. 5-7, and receiver embodiments are described below with reference to FIGS. 8-10.

Figure 5:
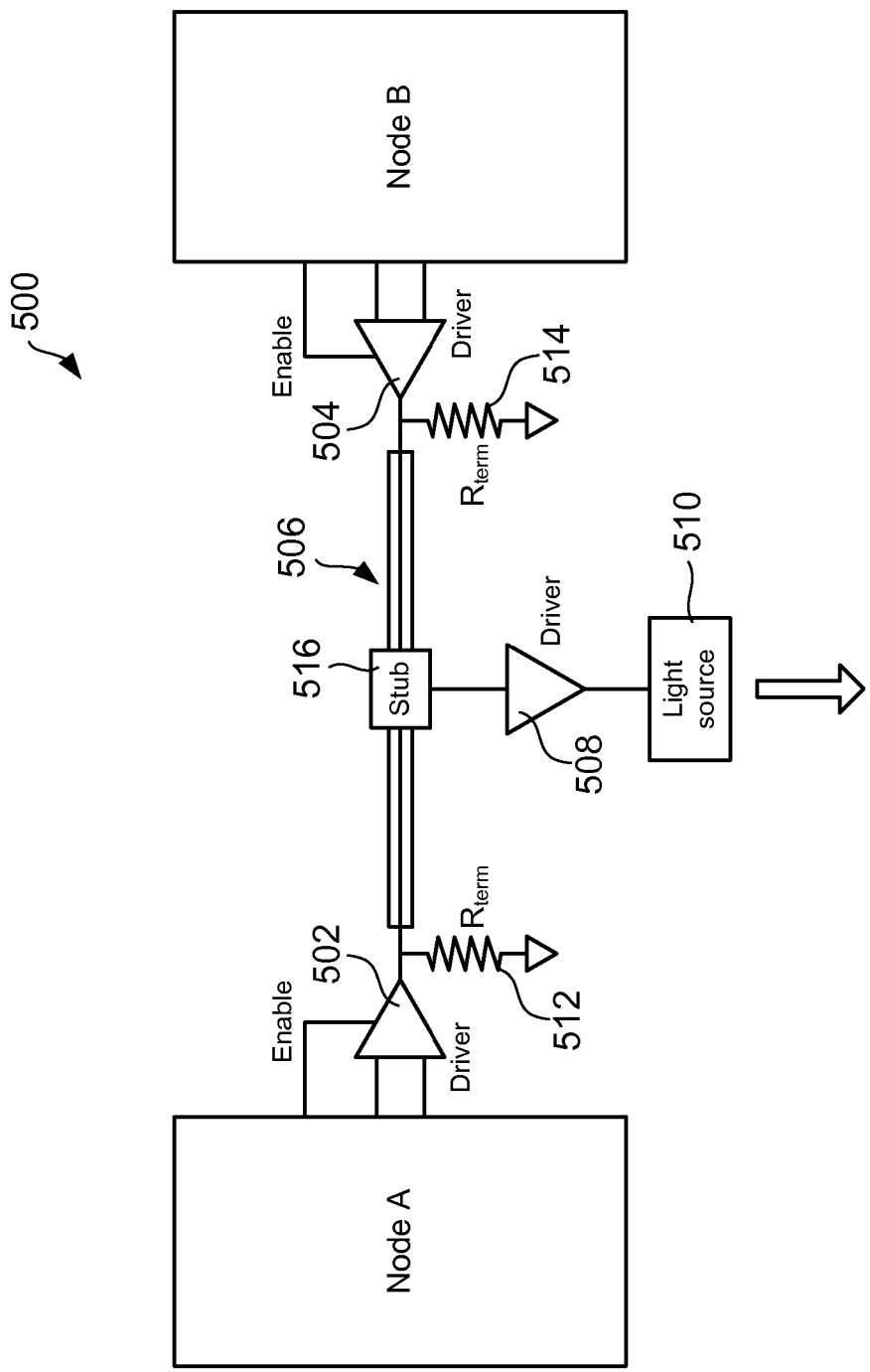
FIG. 5 shows a schematic representation of a first transmitter configured in accordance with embodiments of the present invention.

FIG. 5 shows a schematic representation of a first transmitter 500 configured in accordance with embodiments of the present invention. The transmitter 500 is disposed between neighboring nodes A and B. The transmitter 500 includes two drivers 502 and 504, transmission lines 506, a laser driver 508, and a light source 510. Driver 502 is electronically coupled to node A and electronically coupled to a first end of transmission lines 506. Driver 504 is electronically coupled to node B and electronically coupled to a second end of transmission lines 506. As shown in FIG. 5, the drivers 502 and 504 are activated by enablement signals provided by nodes A and B, respectively. The transmitter 500 includes two terminating resistors 512 and 514. The first terminating resistor 512 is electronically coupled to the transmission lines 506 near the driver 502, and the second terminating resistor 514 is electronically coupled to the transmission lines 506 near the driver 504. The terminating resistors 512 and 514 are selected to phase match the characteristic impedance of the transmission lines 506 connecting nodes A and B to the transmitter. Thus, the transmitter 500 can also be called a "double terminated transmitter." The transmitter 500 also includes a stub 516 that is electronically coupled to the transmission lines 506 and the relatively high input impedance laser driver 508. The stub 516 can be a single relatively short piece of relatively low resistance wire disposed adjacent to the transmission lines 506. The light source 510 can be a laser or a light-emitting diode that outputs light directed to an optical tap, as described above with reference to FIGS. 1-3.

Nodes A and B each receive exclusive access to the transmitter 500 when permission to use the broadcast bus 100 is granted. Suppose for the sake of discussion that node B is granted access to the broadcast bus 100 for a period of time. Node B begins by sending an electrical enablement signal to activate driver 504, while node A does not send an enablement signal to driver 502. The driver 504 amplifies an information encoded electrical signal produced by node B and places the amplified electrical signal on the transmission lines 506. The electrical signal is composed of a series of high and low voltage pulses, where a relatively high amplitude voltage may represent the bit "0" and a relatively low voltage or "no" voltage may represent the bit "1." The stub 516 located adjacent to the transmission lines 506 taps or removes a portion of the electrical signal from the transmission lines 506. The tapped portion of the electrical signal is sent to the laser driver 508, which amplifies and sends the electrical signal to the light source 510. The light source emits an optical signal composed of a series of relatively high and low amplitude electromagnetic radiation, where a relatively high amplitude may represent the bit "0" and a relatively low amplitude or "no" amplitude may represent the bit "1." The series of relatively high and low amplitudes of the emitted electromagnetic radiation comprising the optical signal corresponds to the series of relatively high and low amplitude voltages comprising the electrical signal carried by the transmission lines 506. Because the stub 516 only taps a portion of the electrical signal carried by the transmission lines 506, a portion of the electrical signal still remains on the transmission lines 506. The terminating resistor 512 removes the electrical signal remaining on the transmission lines 506 and prevents the electrical signal from being reflected back toward the node B. When node B is finished sending electrical signals, the enablement signal sent to driver 504 is terminated.

Figure 6:
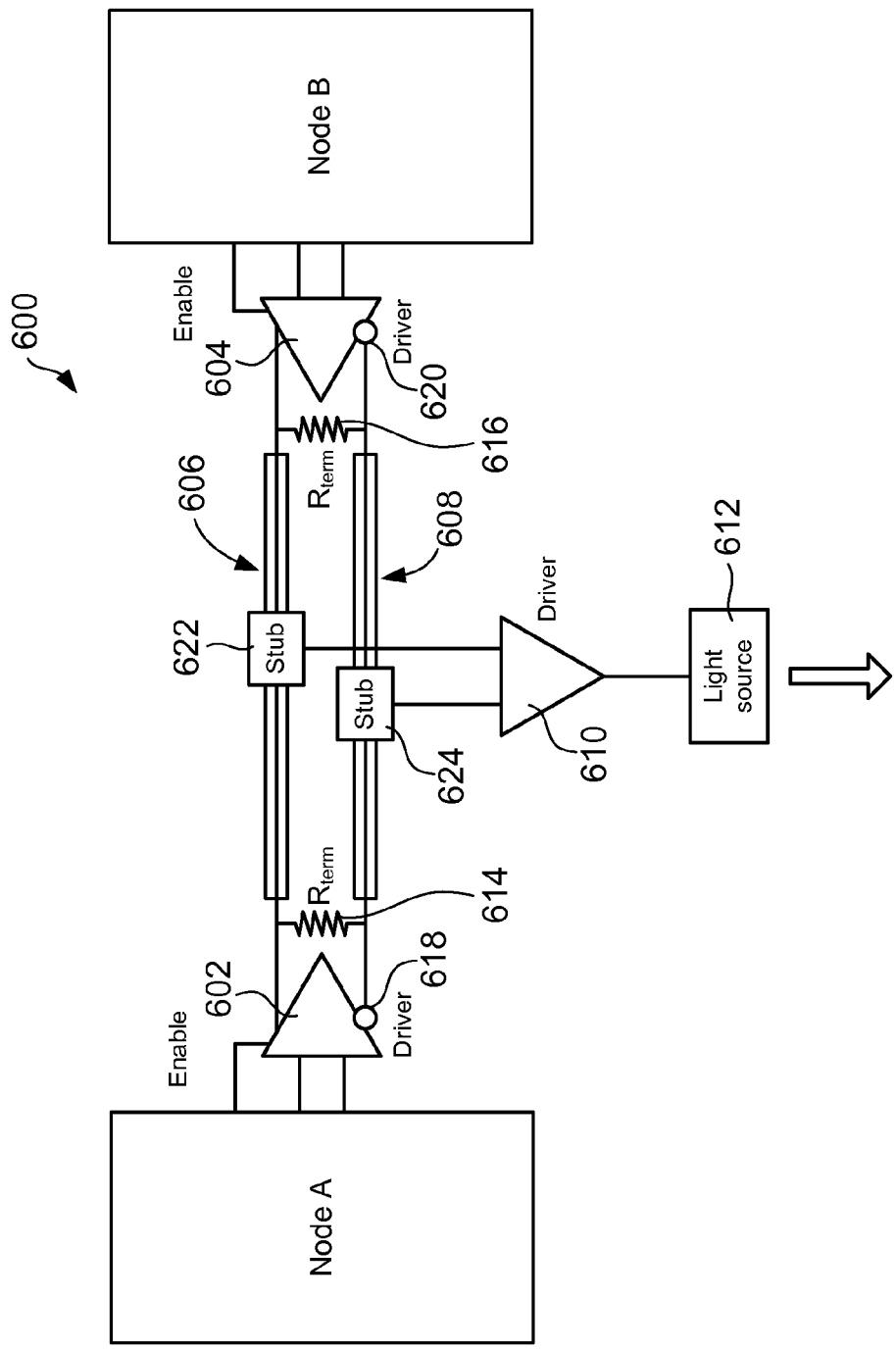
FIG. 6 shows a schematic representation of a second transmitter configured in accordance with embodiments of the present invention.

FIG. 6 shows a schematic representation of a second transmitter 600 configured in accordance with embodiments of the present invention. The transmitter 600 is disposed between neighboring nodes A and B. The transmitter 600 includes two drivers 602 and 604, two set of transmission lines 606 and 608, a laser driver 610, and a light source 612. Driver 602 is electronically coupled to node A and electronically coupled to first ends of transmission lines 606 and 608. Driver 604 is electronically coupled to node B and electronically coupled to second ends of transmission lines 606 and 608. As shown in FIG. 6, the drivers 602 and 604 are activated by enablement signals provided by nodes A and B, respectively. The transmitter 600 includes two terminating resistors 614 and 616. The first terminating resistor 614 is electronically coupled to the two sets of transmission lines 606 and 608 near the driver 602, and the second terminating resistor 616 is electronically coupled to the two sets of transmission lines 606 and 608 near the driver 604. The terminating resistors 614 and 616 match the differential mode characteristic impedance of the sets of transmission lines 606 and 608 connecting nodes A and B to the transmitter in order to minimize any electrical reflections back into the transmitter. The drivers 602 and 604 also include inverters 618 and 620 that are electronically coupled to the first and second ends of the transmission lines 608. The inverter outputs a voltage corresponding to the opposite bit value to its input. The transmitter 600 also includes two stubs 622 and 624 electronically coupled to the transmission lines 606 and 608, respectively. The stubs are also electronically coupled to the relatively high input impedance laser driver 610. The stubs 622 and 624 can be a single relatively short piece of relatively low resistance wire disposed adjacent to the transmission lines 606 and 608, respectively. The light source 612 can be a laser or a light-emitting diode that outputs light directed to an optical tap, as described above with reference to FIGS. 1-3.

Nodes A and B each receive exclusive access to the transmitter 600 when permission to use the broadcast bus 100 is granted. Suppose for the sake of the following discussion that node A is granted access to the broadcast bus 100 for a period of time. Node A begins by sending an electrical enablement signal to activate driver 602. The driver 602 amplifies an information encoded electrical signal produced by node A and places the amplified electrical signal on the two sets of transmission lines 606 and 608. The inverter 618 changes a relatively high amplitude voltage representing the bit "0" into a relatively low or no amplitude voltage representing the bit "1" and changes a relatively low or no amplitude voltage representing the bit "1" into a relatively high amplitude voltage representing the bit "0." The two sets of transmission lines 606 and 608 are differential transmission lines that in combination with the inverters 618 and 620 form complementary logic or differential signaling. Differential signalling is a method of sending information electrically by means of two complementary signals sent on two separate transmission lines. Driver 602 outputs the same electrical signal to the sets of transmission lines 606 and 608. However, when a relatively high amplitude voltage is sent on transmission lines 606, the inverter 618 sends a relatively low or no amplitude voltage on transmission lines 608. Thus, the electrical signals carried by the two sets of transmission lines 606 and 608 are complementary. For example, consider an electrical signal encoding the serial bit stream "10101." The complementary electrical signal encodes the serial bit stream "01010." The stubs 622 and 624 tap or remove portions of the complementary electrical signals from the transmission lines 606 and 608 and send the complementary electrical signals to the laser driver 610. The laser driver 610 reads the difference between the two complementary electrical signals and amplifies and sends an electrical signal to the light source 612, which produces an optical signal composed of a series of relatively high and low amplitude electromagnetic radiation that correspond to the series of high and low amplitude voltages in the electrical signal output from node A. The terminating resistor 616 prevents the complementary electrical signals from being reflected back on the transmission lines 606 and 608 to the node A. When node A is finished sending electrical signals, the enablement signal sent to driver 602 is terminated.

Figure 7A:
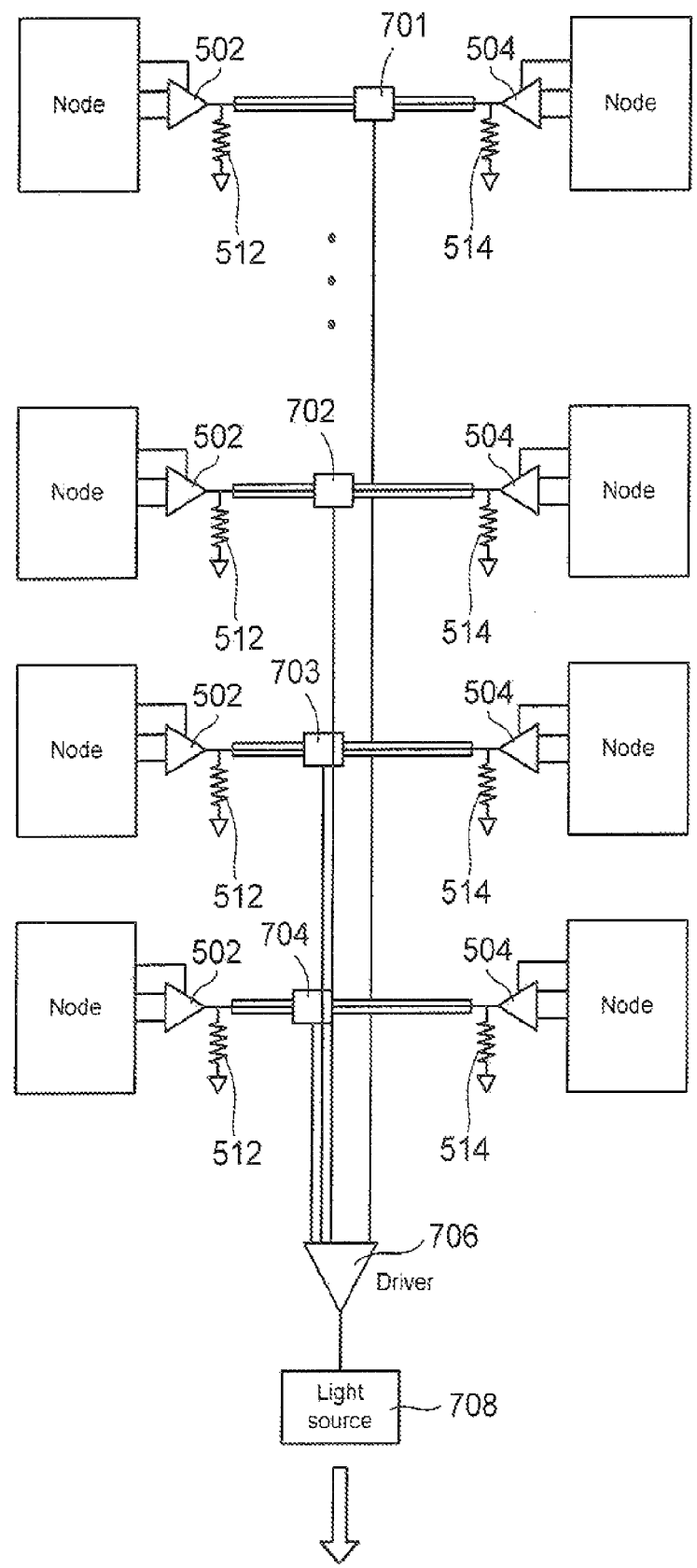
FIGS. 7A-7B show multi-node transmitters configured in accordance with embodiments of the present invention.
Figure 7B:
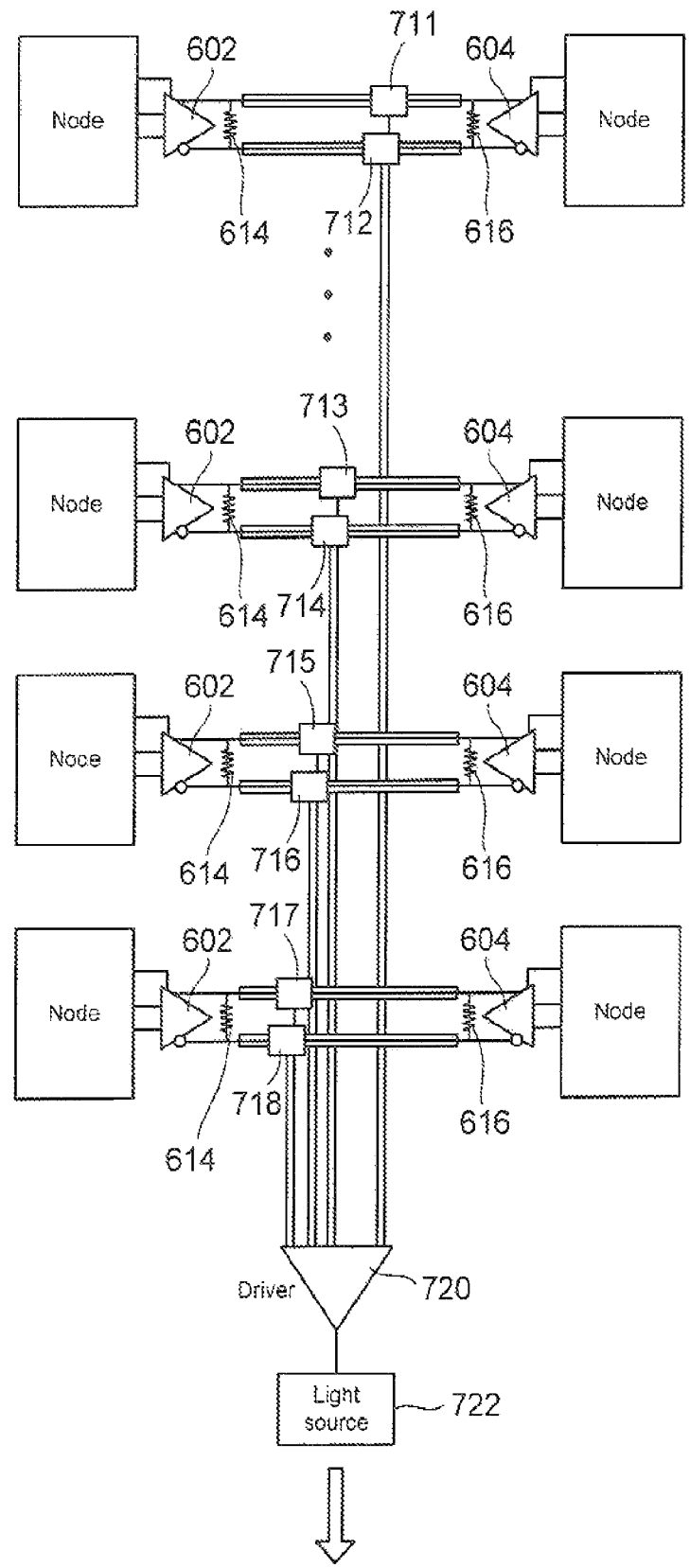

As described above with reference to FIG. 3, transmitters can be configured to electronically communicate with more than two nodes. This can be accomplished by repeating the drivers, transmission lines, stubs, and terminal transistor elements of the transmitters 500 and 600. FIGS. 7A-7B show multi-node transmitters configured in accordance with embodiments of the present invention. As shown in FIG. 7A, eight of the nodes are represented and each pair of nodes is electronically coupled to two drivers, transmission lines, and two terminating resistors that are configured and operated as described above with reference to FIG. 5. The stubs 701-704 are electronically coupled to a driver 706 which is electronically coupled to a light source 708. Only one node is allowed to broadcast at a time by sending an electrical signal to the driver 706. The driver 706 amplifies and sends the electrical signal to the light source 708, which produces an optical signal encoding the same information as the electrical signal. As shown in FIG. 7B, eight of the nodes are represented and each pair of nodes is electronically coupled to two drivers, two sets of transmission lines, and two terminating resistors that are configured and operated as described above with reference to FIG. 6. The stubs 711-718 are electronically coupled to a driver 720 which is electronically coupled to a light source 722. Only one node is allowed to broadcast at a time by sending an electrical signal to the driver 720. The driver 720 amplifies and sends the electrical signal to the light source 722, which produces an optical signal encoding the same information as the electrical signal.

Figure 8:
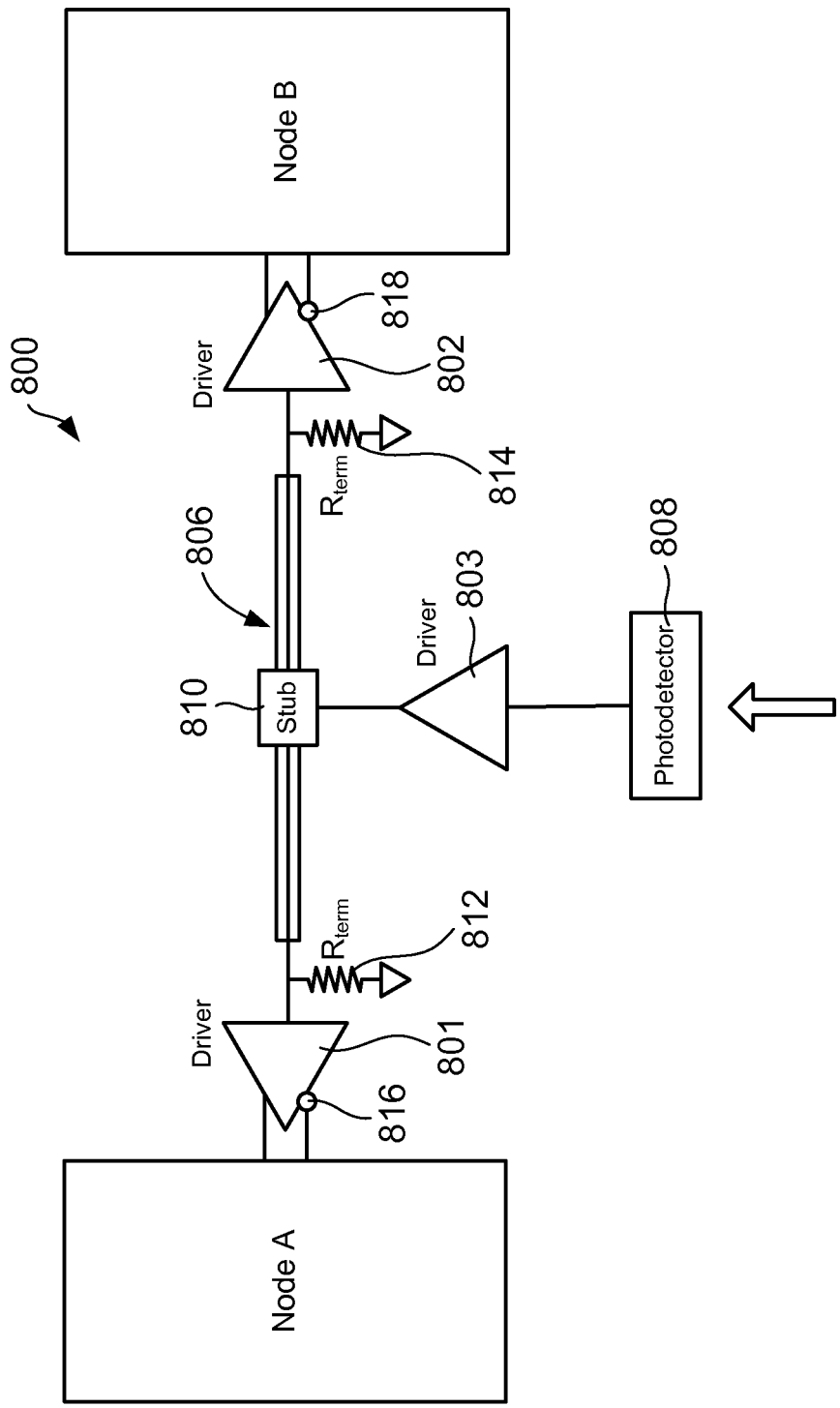
FIG. 8 shows a schematic representation of a first receiver configured in accordance with embodiments of the present invention.

FIG. 8 shows a schematic representation of a first receiver 800 configured in accordance with embodiments of the present invention. The receiver 800 is disposed between neighboring nodes A and B. The receiver 800 includes three drivers 801-803, transmission lines 806, a photodetector 808, and a stub 810. Driver 801 is electronically couple to node A and electronically coupled to a first end of transmission lines 806, driver 802 is electronically coupled to node B and electronically coupled to a second end of transmission lines 806, and driver 803 is electronically coupled to the stub 810 and the photodetector 808. The receiver 800 includes two terminating resistors 812 and 814. The first terminating resistor 812 is electronically coupled to the transmission lines 806 near the driver 801, and the second terminating resistor 814 is electronically coupled to the transmission lines 806 near the driver 802. The terminating resistors 812 and 814 are selected to match the characteristic impedance of the transmission lines 806 connecting nodes A and B to the receiver in order to prevent a signal from being reflected back to nodes A or B. Thus, the receiver 800 can also be called a "double terminated receiver." The drivers 801 and 802 also include inverters 816 and 818 on one of two outputs leading to nodes A and B. The photodetector 808 is positioned to receive optical signals directed from an optical tap, as described above with reference to FIGS. 1-3. The photodetector 808 can be a photodiode, a phototransistor, or any other suitable device for converting optical signals into electrical signals.

The photodetector 808 receives optical signals from an optical tap or mirror, as described above with reference to FIG. 1, and converts the optical signals into electrical signals that are transmitted to the driver 803. The driver 803 amplifies the electrical signals and sends the electrical signals to the stub 810, which places the electrical signals on the transmission lines 806. The electrical signals are simultaneously sent to both drivers 801 and 802, which amplify and send the electrical signals to nodes A and B, respectively. The inverters 816 and 818 provide complementary logic by inverting one of the two electrical signals sent to nodes A and B. The terminal resisters 812 and 814 prevent residual electrical signals from being reflected back onto the transmission lines 806. When the information is broadcast to nodes A and B, nodes A and B can begin separately processing the information encoded in the electrical signals.

Figure 9:
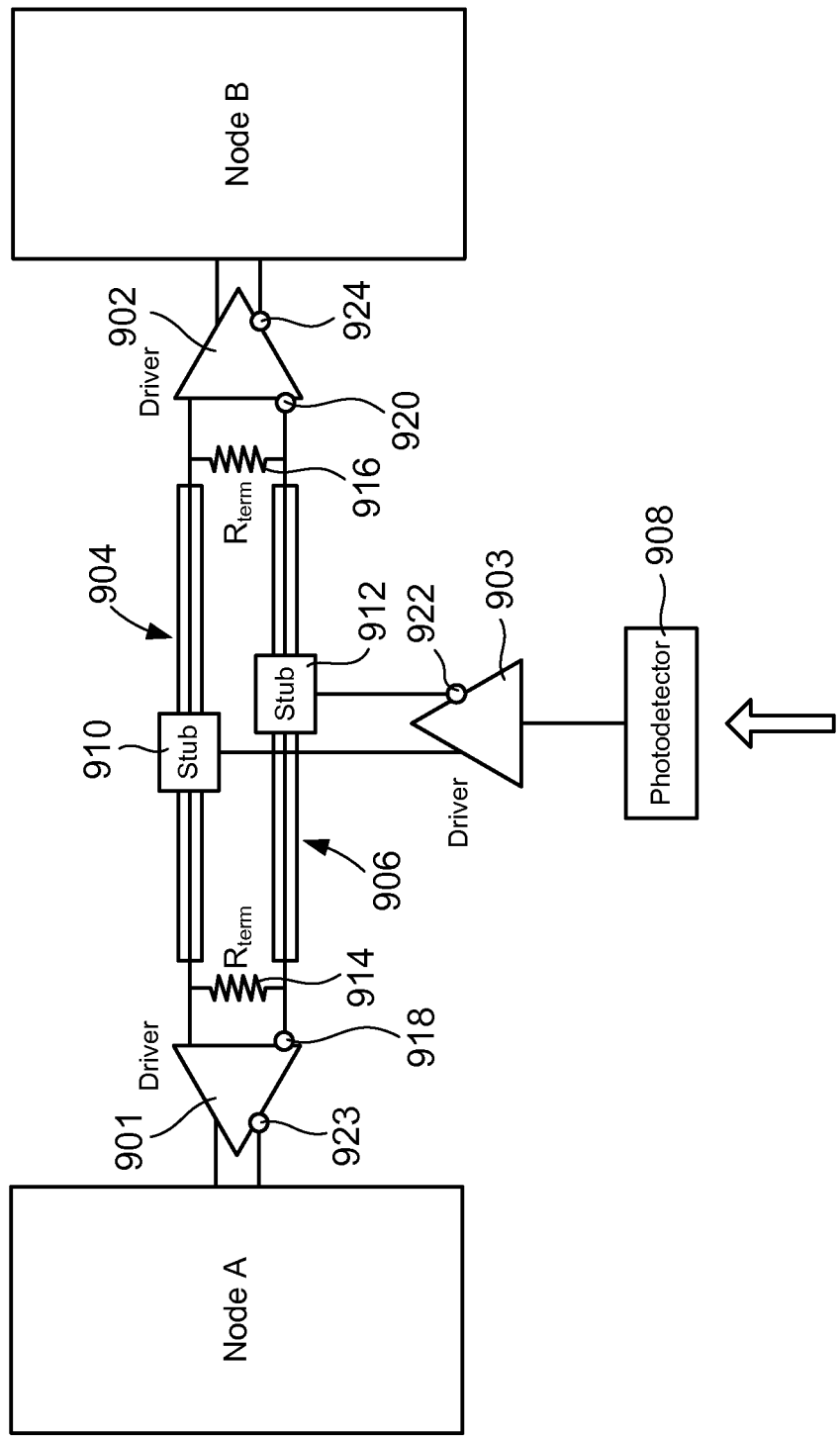
FIG. 9 shows a schematic representation of a second receiver configured in accordance with embodiments of the present invention.

FIG. 9 shows a schematic representation of a second receiver 900 configured in accordance with embodiments of the present invention. The receiver 900 is disposed between neighboring nodes A and B. The receiver 900 includes three drivers 901-903, two sets of transmission lines 904 and 906, a photodetector 908, and two stubs 910 and 912. As shown in FIG. 9, driver 901 is electronically coupled to node A and electronically coupled to first ends of transmission lines 904 and 906, driver 902 is electronically coupled to node B and electronically coupled to second ends of transmission lines 904 and 906, and driver 903 is electronically coupled to the stubs 910 and 912 and the photodetector 908. The receiver 900 includes two terminating resistors 914 and 916. The first terminating resistor 914 is electronically coupled to the two sets of transmission lines 904 and 906 near the driver 901, and the second terminating resistor 916 is electronically coupled to the two sets of transmission lines 904 and 906 near the driver 902. The terminating resistors 914 and 916 match the differential mode characteristic impedance of the two sets of transmission lines 904 and 906 connecting nodes A and B to the receiver. The drivers 901 and 902 also include inverters 918 and 920 electronically coupled to the first and second ends of the transmission lines 906. As described above with reference to FIG. 6, the two sets of transmission lines 904 and 906 are differential transmission lines that in combination with the inverters 918 and 920 form differential signaling. The drivers 901-903 also include inverters 922-924 on one of two output signal lines. The photodetector 908 is positioned to receive optical signals directed from an optical tap, as described above with reference to FIGS. 1-3, and can be a photodiode, a phototransistor, or any other suitable device for converting optical signals into electrical signals.

The photodetector 908 receives optical signals from an optical tap or mirror and converts the optical signals into electrical signals that are transmitted to the driver 903. The driver 903 amplifies the electrical signals and sends amplified electrical signals to the stub 910 and a complementary version of the electrical signals to the stub 912. The stub 912 places the complementary version of the electrical signals on the transmission lines 906, and the stub 910 places unaltered or true electrical signals on the transmission lines 904. The inverters 918 and 920 convert the complementary version of electrical signals back into true electrical signals, and the drivers 901 and 902 receive the electrical signals as input. The inverters 923 and 924 of drivers 901 and 902, respectively, invert one of the electrical signals so that nodes A and B both receive complementary electrical signals. Nodes A and B interpret the electrical signals by reading the differences between the electrical signals and the complementary version of the electrical signals. Nodes A and B begin separately processing the information encoded in the electrical signals.

Figure 10A:
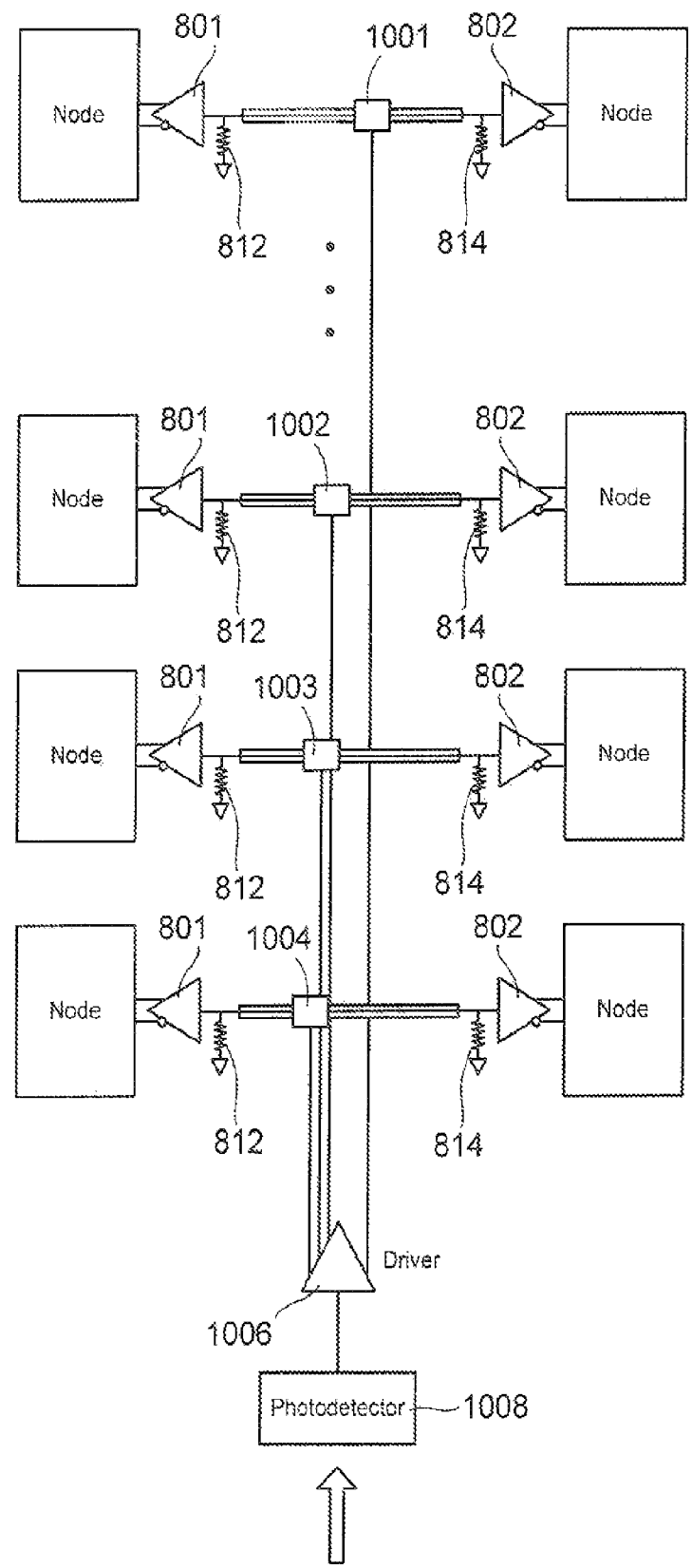
FIGS. 10A-10B show multi-node receivers configured in accordance with embodiments of the present invention.
Figure 10B:
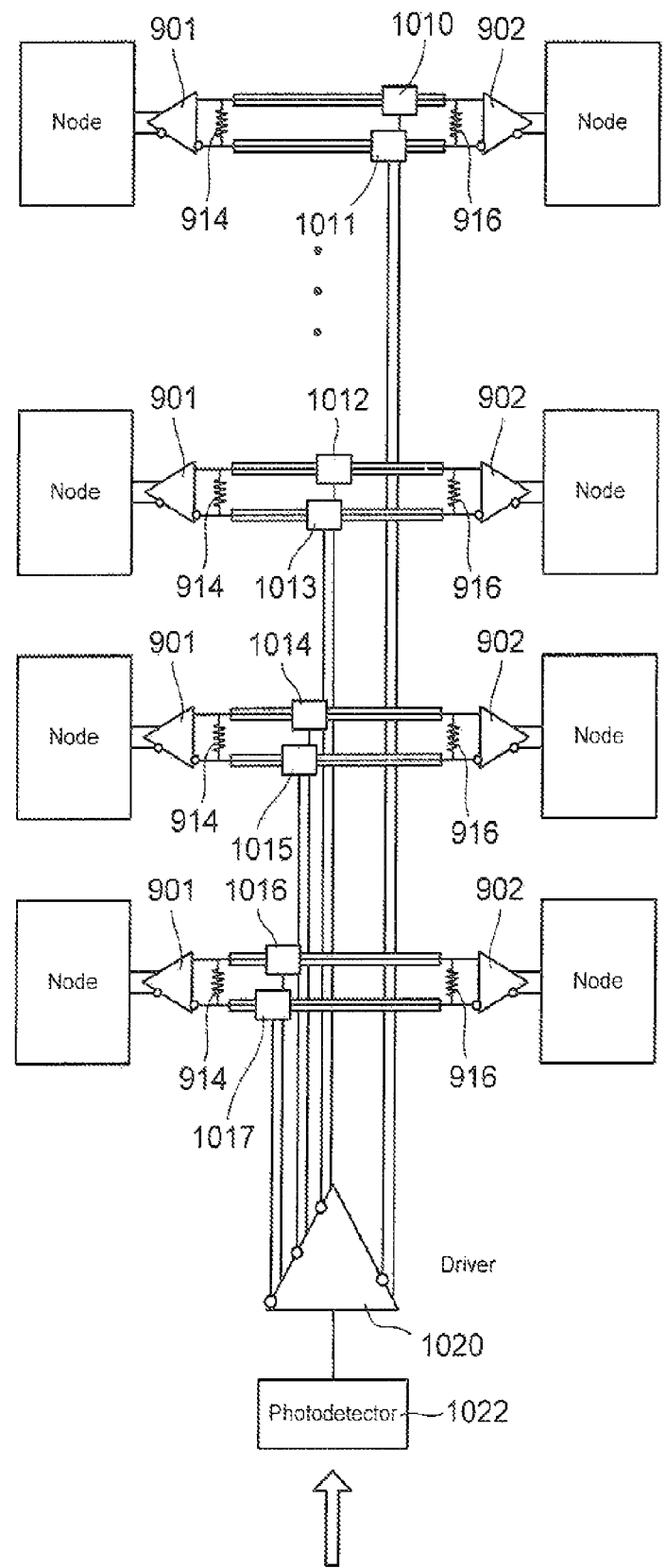

As described above with reference to FIG. 3, receivers can be configured to electronically communicate with more than two nodes. This can be accomplished by repeating the drivers, transmission lines, stubs, and terminal transistor elements of the receivers 800 and 900. FIGS. 10A-10B show multi-node receivers configured to receive optical signals in accordance with embodiments of the present invention. As shown in FIG. 10A, eight of the nodes are represented and each pair of nodes is electronically coupled to two drivers, transmission lines, and two terminating resistors that are configured and operated as described above with reference to FIG. 8. The stubs 1001-1004 are electronically coupled to a driver 1006 which is electronically coupled to a photodetector 1008. When optical signals are detected at the photodetector 1008, an electrical signal is sent to the driver 1006 which amplifies and sends the electrical signals to the stubs 1001-1004. The electrical signals are sent to each pair of nodes as described above with reference to FIG. 8. As shown in FIG. 10B, eight of the nodes are represented and each pair of nodes is electronically coupled to two drivers, two sets of transmission lines, and two terminating resistors that are configured and operated as described above with reference to FIG. 9. The stubs 1010-1017 are electronically coupled to a driver 1020 which is electronically coupled to a photodetector 1022. When optical signals are detected at the photodetector 1022, an electrical signal is sent to the driver 1020 which amplifies and sends the complementary electrical signals to the stubs 1010-1017. The electrical signals are sent to each pair of nodes as described above with reference to FIG. 9.

In certain embodiments, the nodes can be configured to broadcast and receive data packets of information. In general, each packet is encoded in an electrical signal and includes the header identifying one of the destination nodes. A node receiving an electrical signal with the header of a different node discards the electrical signals, otherwise, the node processes the electrical signal. For example, if the electrical signals include a header identifying node A but not to node B, then node B receives and discards the electrical signals and node A processes the electrical signals. In other embodiments, arbitration can be used to determine which nodes receive broadcast information. For example, when node A is permitted to receive broadcast information and not node B, node A processes the electrical signal and node B discards the electrical signals.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. An optical broadcast bus comprising:
 a number of optical interfaces, each optical interface electronically coupled to at least two nodes;
 a fan-in bus optically coupled to the number of optical interfaces; and
 a fan-out bus optically coupled to the number of optical interfaces, wherein each optical interface further comprises a transmitter configured to convert an electrical signal produced by either of the electronically coupled at least two nodes into an optical signal that is received and directed by the fan-in bus to the fan-out bus and broadcast by the fan-out bus to the number of optical interfaces, wherein each optical interface converts the optical signal into an electrical signal that is sent to each of the electronically coupled at least two nodes for processing, wherein the transmitter of each optical interface comprises:
  at least two drivers, wherein each of the at least two drivers is associated with a respective one of the at least two nodes electronically coupled to the transmitter, wherein a given driver of the at least two drivers receives an enable signal from a given node of the at least two nodes during a period of time that the given node has exclusive access to the transmitter; and
  at least two terminating resistors, wherein each of the terminating resistors is coupled to a corresponding one of the at least two drivers, and each of the terminating resistors is configured to prevent electrical signals from being reflected back toward the at least two nodes.

2. The bus of claim 1 wherein each optical interface further comprises a receiver configured to convert the optical signal into an electrical signal that is processed by the electronically coupled at least two nodes.

3. The bus of claim 1 further comprising a master control configured to operate as an optical-to-electrical-to-optical converter that receives the optical signals from the fan-in bus, reproduces the optical signals, then transmits the reproduced optical signals on the fan-out bus.

4. The bus of claim 3 wherein the master control further comprises arbitration to determine which of the at least two nodes has permission to broadcast over optical broadcast bus.

5. The bus of claim 1 wherein the fan-in and fan-out buses further comprise:
 a number of optical communication paths;
 a first set of optical taps configured and oriented to direct optical signals output from each optical interface over certain optical communication paths to the fan-out bus; and
 a second set of optical taps configured and oriented to divert a portion of the optical signals to each of the optical interfaces.

6. The bus of claim 5 wherein the optical communication paths further comprises hollow waveguides through which the optical signals propagate.

7. The bus of claim 5 wherein the optical taps further comprise beamsplitters.

8. The bus of claim 1 wherein the fan-in bus is configured to send optical signals from the number of optical interfaces to the fan-out bus with approximately the same optical power.

9. The bus of claim 1 wherein the fan-out bus is configured to distribute optical signals to each of the optical interfaces with substantially the same optical power.

10. An optical signal transmitter comprising:
 transmission lines electronically coupled at a first end to a node and configured to receive electrical signals produced by the node;
 a stub disposed adjacent to the transmission lines and configured to extract a portion of the electrical signal carried by the transmission lines;
 a light source electronically coupled to the stub and configured to convert the electrical signals into optical signals;
 a terminating resistor electronically coupled to the transmission lines at a second end and configured to prevent the electrical signals from being reflected back toward the node along the transmission lines;
 a first driver disposed between the first end of the transmission lines and the node and configured to amplify the electrical signals produced by the node; and
 a second driver disposed between the stub and the light source and configured to amplify the electrical signal extracted by the stub.

11. A optical signal receiver comprising:
 a photodetector configured to receive and convert optical signals into electrical signals;
 a stub configured to receive the electrical signals from the photodetector;

transmission lines electronically coupled to the stub and configured to extract and send the electrical signals to a node electronically coupled to the transmission lines at a first end; and a terminating resistor electronically coupled to the transmission lines at a second end and coupled to an electrically neutral node and configured to prevent the electrical signals from being reflected back toward the node along the transmission lines.

12. The receiver of claim 11 further comprising:
a first driver disposed between the first end of the transmission lines and the node and configured to amplify the electrical signals carried by the transmission lines; and
a second driver disposed between the stub and the photodetector and configured to amplify the electrical signal produced by the photodetector.

13. The receiver of claim 11 wherein the photodetector further comprises one of:
a photodiode; and
a phototransistor.

14. An optical broadcast bus comprising:
a number of optical interfaces, each optical interface electronically coupled to at least two nodes;
a fan-in bus optically coupled to the number of optical interfaces; and
a fan-out bus optically coupled to the number of optical interfaces, wherein each optical interface further comprises a transmitter configured to convert an electrical signal produced by either of the electronically coupled at least two nodes into an optical signal that is received and directed by the fan-in bus to the fan-out bus and broadcast by the fan-out bus to the number of optical interfaces, wherein each optical interface converts the optical signal into an electrical signal that is sent to each of the electronically coupled at least two nodes for processing, wherein the transmitter of each optical interface further comprises:
- a plurality of transmission lines, wherein each of the plurality of transmission lines is electronically coupled at a given end to a respective node of the at least two nodes and configured to receive electrical signals produced by the respective node;
- a stub disposed adjacent to the plurality of transmission lines and configured to extract a portion of the electrical signal carried by the plurality of transmission lines;
- a light source electronically coupled to the stub and configured to convert the electrical signals into optical signals;
- a plurality of terminating resistors, wherein each of the plurality of terminating resistors is electronically coupled to a corresponding transmission line of the plurality of transmission lines at the given end and the plurality of terminating resistors are configured to prevent the electrical signals from being reflected back toward the at least two nodes along the plurality of transmission lines;
- a plurality of drivers, wherein each respective driver of the plurality of drivers is disposed between the given end of a respective transmission line of the plurality of transmission lines and the respective node of the at least two nodes and configured to amplify the electrical signals produced by the respective node; and
- another driver disposed between the stub and the light source and configured to amplify the electrical signal extracted by the stub.

15. An optical broadcast bus comprising:
a number of optical interfaces, each optical interface electronically coupled to at least two nodes:
a fan-in bus optically coupled to the number of optical interfaces; and
a fan-out bus optically coupled to the number of optical interfaces, wherein each optical interface further comprises a transmitter configured to convert an electrical signal produced by either of the electronically coupled at least two nodes into an optical signal that is received and directed by the fan-in bus to the fan-out bus and broadcast by the fan-out bus to the number of optical interfaces, wherein each optical interface converts the optical signal into an electrical signal that is sent to each of the electronically coupled at least two nodes for processing, wherein each optical interface comprises an optical signal receiver comprising:
a photodetector configured to receive and convert optical signals into electrical signals;
a stub configured to receive the electrical signals from the photodetector;
a plurality of transmission lines, wherein each of the plurality of transmission lines is electronically coupled to the stub at a given end and electronically coupled to a respective node of the at least two nodes at another end, each of the plurality of transmission lines being configured to extract and send the electrical signals to the respective node of the at least two nodes; and
a plurality of terminating resistors, wherein each of the plurality of terminating resistors is electronically coupled to a respective transmission line of the plurality of transmission lines at the given end of the respective transmission line and coupled to an electrically neutral node and the plurality of terminating resistors are configured to prevent the electrical signals from being reflected back toward the at least two nodes along the plurality of transmission lines.

* * * * *

UNITED STATES PATENT AND TRADEMARK OFFICE
CERTIFICATE OF CORRECTION

PATENT NO. : 8,687,961 B2  
APPLICATION NO. : 13/126840  
DATED : April 1, 2014  
INVENTOR(S) : Michael Renne Ty Tan et al.

Page 1 of 1

It is certified that error appears in the above-identified patent and that said Letters Patent is hereby corrected as shown below:

In the Claims

In column 14, line 17, in Claim 15, delete "nodes:" and insert -- nodes; --, therefor.

Signed and Sealed this
Second Day of September, 2014

Michelle K. Lee
*Deputy Director of the United States Patent and Trademark Office*